(12) United States Patent
Lev

(10) Patent No.: US 8,280,983 B2
(45) Date of Patent: Oct. 2, 2012

(54) DISTRIBUTED SEARCH IN A CASUAL NETWORK OF SERVERS

(75) Inventor: Boaz Lev, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 600 days.

(21) Appl. No.: 11/743,259

(22) Filed: May 2, 2007

(65) Prior Publication Data

US 2008/0275959 A1 Nov. 6, 2008

(51) Int. Cl.
*G06F 15/16* (2006.01)

(52) U.S. Cl. ........ 709/219; 709/201; 709/217; 709/218; 711/1; 719/316

(58) Field of Classification Search .......... 709/206–245; 701/117; 707/3–205; 717/126; 455/456.3
See application file for complete search history.

(56) References Cited

U.S. PATENT DOCUMENTS

| | | | | |
|---|---|---|---|---|
| 5,606,693 | A | 2/1997 | Nilsen et al. | 395/610 |
| 6,208,955 | B1 | 3/2001 | Provan et al. | 703/20 |
| 6,212,545 | B1 | 4/2001 | Ohtani et al. | 709/202 |
| 6,282,580 | B1 * | 8/2001 | Chang | 719/316 |
| 6,289,382 | B1 * | 9/2001 | Bowman-Amuah | 709/226 |
| 6,332,163 | B1 * | 12/2001 | Bowman-Amuah | 709/231 |
| 6,339,832 | B1 * | 1/2002 | Bowman-Amuah | 714/35 |
| 6,434,548 | B1 | 8/2002 | Emens et al. | 707/3 |
| 6,434,568 | B1 * | 8/2002 | Bowman-Amuah | 1/1 |
| 6,434,628 | B1 * | 8/2002 | Bowman-Amuah | 714/48 |
| 6,438,594 | B1 * | 8/2002 | Bowman-Amuah | 709/225 |
| 6,442,748 | B1 * | 8/2002 | Bowman-Amuah | 717/108 |
| 6,477,580 | B1 * | 11/2002 | Bowman-Amuah | 709/231 |
| 6,477,665 | B1 * | 11/2002 | Bowman-Amuah | 714/39 |
| 6,490,575 | B1 | 12/2002 | Berstis | 707/3 |
| 6,496,850 | B1 * | 12/2002 | Bowman-Amuah | 709/203 |
| 6,502,213 | B1 * | 12/2002 | Bowman-Amuah | 714/49 |
| 6,523,023 | B1 | 2/2003 | Sonnenberg | 707/3 |
| 6,529,909 | B1 * | 3/2003 | Bowman-Amuah | 1/1 |
| 6,529,948 | B1 * | 3/2003 | Bowman-Amuah | 709/217 |

(Continued)

FOREIGN PATENT DOCUMENTS

WO    WO 00/60501    10/2000

OTHER PUBLICATIONS

Vana Kalogeraki et al., "A Local Search Mechanism for Peer-to-Peer Networks," 2002, pp. 300-307.

(Continued)

*Primary Examiner* — Backhean Tiv
(74) *Attorney, Agent, or Firm* — Merchant & Gould

(57) ABSTRACT

Distributed searches in a casual server network may be provided. First it may be determined, at an originating server, that a first request cannot be fulfilled by information associated with the originating server. Then, from the originating server, the first request may be posted to a distributed request ring. Next, at a remote server on the distributed request ring, the first request may be received. The remote server may then query for current data on a data store associated with the remote server that may satisfy the first request. The remote server may next write a foreign reference in the data store. The foreign reference may indicate that the originating server requested the current data. Next, at the originating server, a response may be received to the first request from the remote server. The response may include the current data.

16 Claims, 3 Drawing Sheets

U.S. PATENT DOCUMENTS

| | | | |
|---|---|---|---|
| 6,539,396 B1* | 3/2003 | Bowman-Amuah | 707/769 |
| 6,549,949 B1* | 4/2003 | Bowman-Amuah | 709/236 |
| 6,550,057 B1* | 4/2003 | Bowman-Amuah | 717/126 |
| 6,571,282 B1* | 5/2003 | Bowman-Amuah | 709/219 |
| 6,578,068 B1* | 6/2003 | Bowman-Amuah | 709/203 |
| 6,587,777 B1* | 7/2003 | St. Pierre | 701/117 |
| 6,601,192 B1* | 7/2003 | Bowman-Amuah | 714/38.12 |
| 6,601,234 B1* | 7/2003 | Bowman-Amuah | 717/108 |
| 6,606,660 B1* | 8/2003 | Bowman-Amuah | 709/227 |
| 6,607,485 B2 | 8/2003 | Bardy | 600/300 |
| 6,615,199 B1* | 9/2003 | Bowman-Amuah | 706/50 |
| 6,615,253 B1* | 9/2003 | Bowman-Amuah | 709/219 |
| 6,636,242 B2* | 10/2003 | Bowman-Amuah | 715/764 |
| 6,640,238 B1* | 10/2003 | Bowman-Amuah | 709/201 |
| 6,640,244 B1* | 10/2003 | Bowman-Amuah | 709/207 |
| 6,640,249 B1* | 10/2003 | Bowman-Amuah | 709/228 |
| 6,647,383 B1 | 11/2003 | August et al. | 707/3 |
| 6,658,463 B1* | 12/2003 | Dillon et al. | 709/219 |
| 6,715,145 B1* | 3/2004 | Bowman-Amuah | 718/101 |
| 6,742,015 B1* | 5/2004 | Bowman-Amuah | 718/101 |
| 6,842,906 B1* | 1/2005 | Bowman-Amuah | 719/330 |
| 6,934,702 B2 | 8/2005 | Faybishenko et al. | 767/3 |
| 7,010,581 B2* | 3/2006 | Brown et al. | 709/218 |
| 7,159,014 B2* | 1/2007 | Kausik et al. | 709/217 |
| 7,249,065 B2* | 7/2007 | Bliakhman et al. | 705/26.4 |
| 7,289,964 B1* | 10/2007 | Bowman-Amuah | 705/1.1 |
| 7,349,902 B1* | 3/2008 | Arlitt et al. | 1/1 |
| 7,523,158 B1 | 4/2009 | Nickerson et al. | 709/203 |
| 7,552,220 B2* | 6/2009 | Marmigere et al. | 709/228 |
| 7,631,100 B2* | 12/2009 | Ben-Zvi et al. | 709/245 |
| 2001/0056476 A1* | 12/2001 | Benayoun et al. | 709/218 |
| 2002/0055966 A1* | 5/2002 | Border et al. | 709/200 |
| 2003/0018753 A1* | 1/2003 | Seki | 709/219 |
| 2003/0058277 A1* | 3/2003 | Bowman-Amuah | 345/765 |
| 2003/0065774 A1 | 4/2003 | Steiner et al. | 709/225 |
| 2003/0105837 A1* | 6/2003 | Kamen et al. | 709/220 |
| 2003/0225885 A1* | 12/2003 | Rochberger et al. | 709/226 |
| 2004/0205630 A1* | 10/2004 | Parks et al. | 715/526 |
| 2004/0215602 A1* | 10/2004 | Cioccarelli | 707/3 |
| 2005/0004898 A1 | 1/2005 | Bluhm | 707/3 |
| 2005/0050028 A1 | 3/2005 | Rose et al. | 707/3 |
| 2005/0070308 A1* | 3/2005 | Caspi et al. | 455/456.3 |
| 2005/0076145 A1* | 4/2005 | Ben-Zvi et al. | 709/245 |
| 2005/0172004 A1* | 8/2005 | Fisher | 709/206 |
| 2006/0101408 A1* | 5/2006 | Kotamarthi et al. | 717/126 |
| 2006/0271705 A1* | 11/2006 | Garcia-Luna-Aceves | 709/242 |
| 2006/0277196 A1* | 12/2006 | Oosawa et al. | 707/10 |
| 2007/0073756 A1* | 3/2007 | Manhas et al. | 707/101 |
| 2008/0059943 A1* | 3/2008 | Krevs et al. | 717/103 |
| 2008/0209120 A1* | 8/2008 | Almog et al. | 711/106 |
| 2008/0235301 A1* | 9/2008 | Wright et al. | 707/205 |
| 2009/0109959 A1* | 4/2009 | Elliott et al. | 370/352 |
| 2010/0174756 A1* | 7/2010 | Lazaridis et al. | 707/802 |

OTHER PUBLICATIONS

Steve Waterhouse et al., "Distributed Search in Peer-to-Peer Networks," Jan./Feb. 2002, http://computer.org/internet/, IEEE Internet Computing, pp. 2-6.

Theodore Johnson et al., "Lazy Updates for Distrubuted Search Structure," 1993, pp. 337-346.

Chinese First Office Action dated Oct. 19, 2011 cited in Application No. 200880014531.9.

Chinese Decision on Rejection dated Jul. 23, 2012 cited in Application No. 200880014531.9, 13 pgs.

* cited by examiner

DISTRIBUTED SEARCH IN A CASUAL NETWORK OF SERVERS

BACKGROUND

In conventional systems, if a user seeks data without knowing what server the sought after data resides on, the user can, at best, try to probe all servers on a given network. Conventional systems do not allow servers to participate in a network such that data requests can be posted to the network and the server in the network that can fulfill the request does so. In other words, conventional systems are unable to work with data without knowing the data's locality.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matters scope.

Distributed searches in a casual server network may be provided. First it may be determined, at an originating server, that a first request cannot be fulfilled by information associated with the originating server. Then, from the originating server, the first request may be posted to a distributed request ring. Next, at a remote server on the distributed request ring, the first request may be received. The remote server may then query for current data on a data store associated with the remote server that may satisfy the first request. The remote server may next write a foreign reference in the data store. The foreign preference may indicate that the originating server requested the current data. Next, at the originating server, a response may be received to the first request from the remote server. The response may include the current data.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
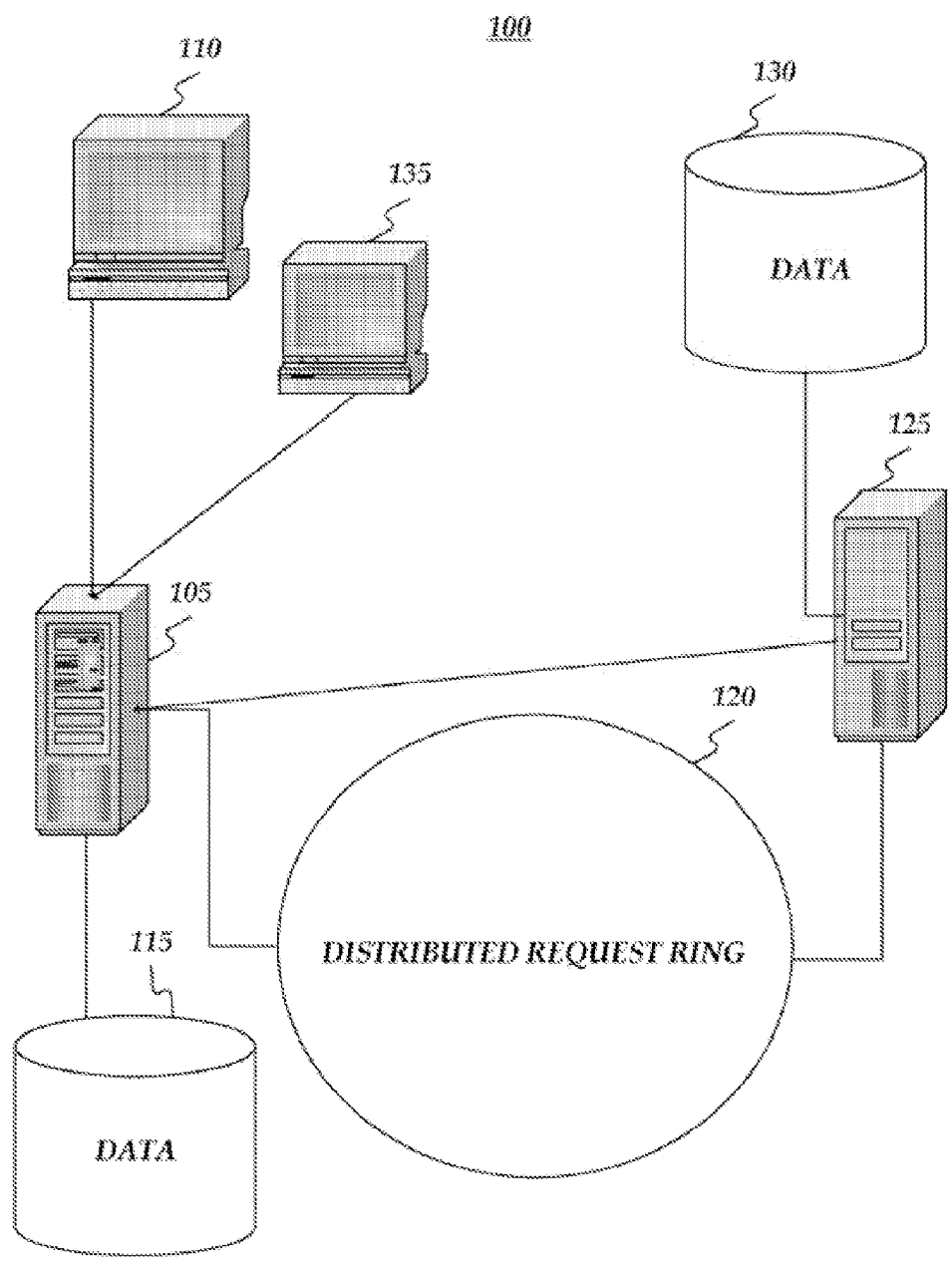
FIG. 1 is a block diagram of m operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to tie disclosed methods. Accordingly, the following detailed description does not limit the invention. Instead, the proper scope of the invention is defined by tie appended claims.

Distributed searches in a casual server network may be provided. Consistent with embodiments of the present invention, servers may participate in a casual network such that data requests cam post to the casual network and the server that can fulfill the request may do so. For example, users may work with data without knowing the locality of the data. Embodiments of the invention may allow servers that may or may not be bull for this "distributedness", to work in a distributed manner. Furthermore, a track-back mechanism may be provided that may allow for updates to data to be propagated.

FIG. 1 shows a causal network 100. As shown in FIG. 1, casual network 100 may include an originating server 105, a first client 110, an originating data store 115, a distributed request ring 120, a remote server 125, a remote data store 130, and a second client 135. For example, as described below with respect to FIG. 3, a computing device 300 may be used to implement originating server 106 and any of other computing devices 318 may be used to implement remote server 125. Originating server 105 and remote server 125 may be directly connected and do not have to be connected through distributed request ring 120. The aforementioned are examples and any processors or servers may be used.

Figure 2:
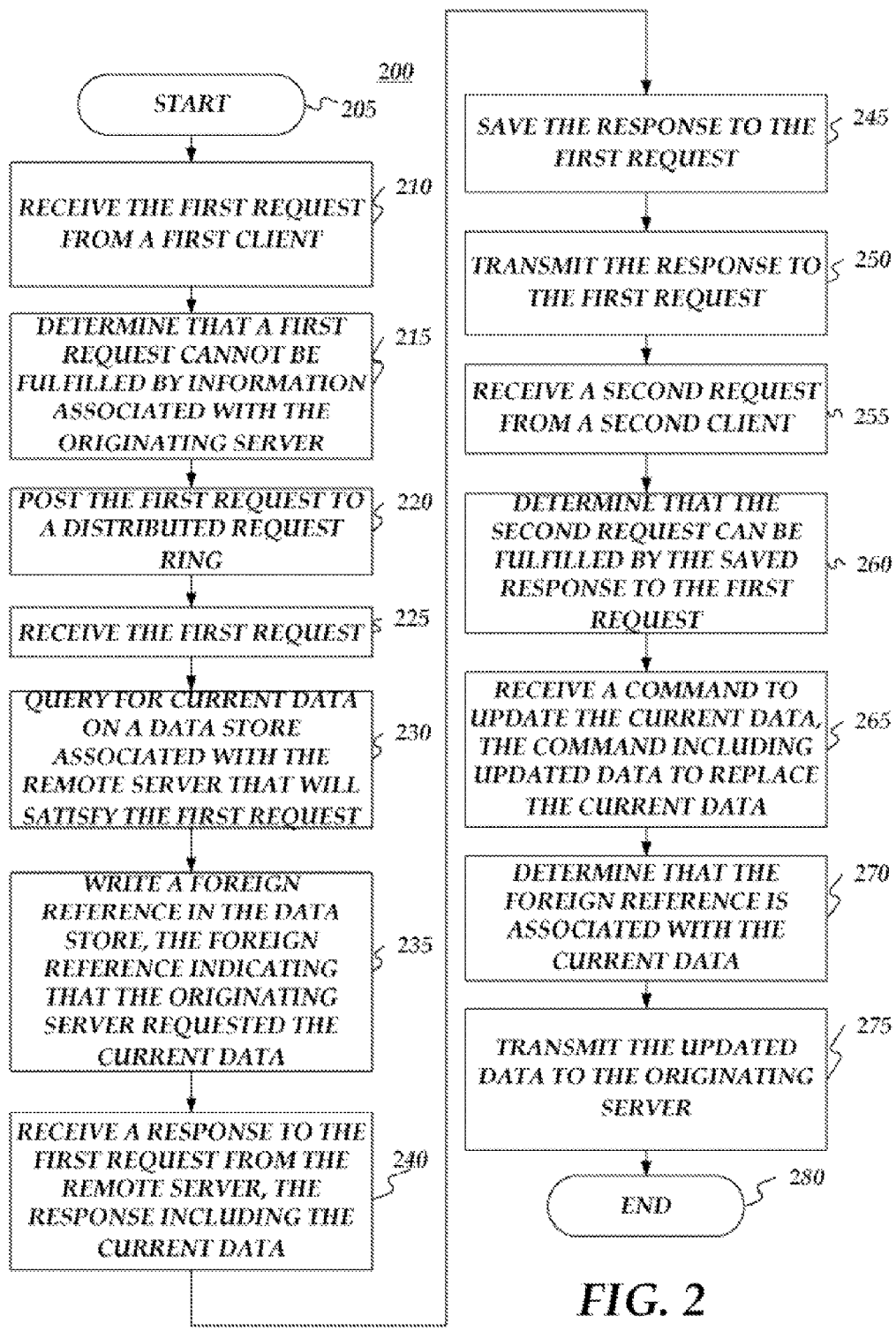
FIG. 2 is a flow chart of a method for providing a distributed casual search.

FIG. 2 is a flow chart setting forth the general stages involved in a method 200 consistent with an embodiment of the invention for providing a distributed casual search. Method 200 may be implemented using a computing device 300 and any of other computing devices 318 as described in more detail below with respect to FIG. 3. Ways to implement the stages of method 200 will be described in greater detail below. Method 200 may begin at starting block 205 and proceed to stage 210 where originating server 105 may receive a first request from first client 110. For example, first client 110 may be connected to originating server 105. A user using first client 110 may come up with a request for some data or some services. Consequently, the user may post the first request to originating server 105.

From stage 210, where originating server 105 receives the first request from first client 110, method 200 may advance to stage 21S where originating server 105 may determine that a first request cannot be fulfilled by information associated with originating server 105. For example, originating server 105 may first check locally in originating data store 115 to see if it can fulfill the first request.

Once originating server 105 determines that the first request cannot be fulfilled by information associated with originating server 105 in stage 215, method 200 may continue to stage 220 where originating server 105 may post the first request to distributed request ring 120. For example, distributed request ring 120 may comprise at least one other server in addition to originating server 105 and distributed request ring 120, which may be considered to be in distributed request ring 120. Each server in distributed request ring 120, except the server that posted the first request (e.g. originating server 105), may pick up the request. Each server in distributed request ring 120 may be reachable by the other severs in distributed request ring 120. However, servers on distributed request ring 120 may not know the identity of other servers on distributed request ring 120. For example, originating server 105 may not know the identity of other servers on distributed request ring 120. Moreover, the first request may be configured to be received at an application program interface (API)

of an operating system (OS) of at least one other server in distributed request ring 120 and an API of an OS of remote server 125.

After originating server 105 posts the first request to distributed request ring 120 in stag 220, method 200 may proceed to stage 225 where remote server 125, on the distributed request ring 120, may receive the first request. From stage 225, where remote server 125 receives the first request, method 200 may advance to stage 230 where remote server 125 may query for current data on data store 130 associated with remote server 125 that may satisfy the first request. For example, remote server 125, being in distributed request ring 120, may pick up the first request. In order to service the received first request, remote server 125 may query data store 130 to see if the first request can be serviced.

Once remote server 125 queries for current data on data store 130 in stage 230, method 200 may continue to stage 235 where remote server 125 may write a foreign reference in data store 130. The foreign reference may indicate that originating server 105 requested the current data. For example, the foreign reference may identity originating server 105 from which the first request came. The foreign reference may be written so that any requesting server can be updated if the data used to service the first request is ever updated or updated within a predefined time period. Furthermore, consistent with embodiments of the invention, it is not necessarily a time period that may define an updating boundary. Rather any predicate can be used. Consequently, if is possible for the "owner" of the data to decide if updates are to be propagated. In other words, time may not he the only factor deciding the survival of foreign copies, any Boolean predicate, for example, may be used.

After remote server 125 writes the foreign reference in data store 130 in stage 235, method 200 may proceed to stage 240 where originating server 105 may receive a response to the first request from remote server 125. The response may include current data that responds to the first request. From stage 240, where originating server 105 receives the response to the first request, method 200 may advance to stage 245 where originating server 105 may save the response to the first request. For example, originating server 105 may be configured to discard the saved response after a predetermined time period.

Once originating server 105 saves the response to the first request in stage 246, method 200 may continue to stage 250 where originating server 105 may transmit, to first client 110, the response to the first request. For example, originating server 105 may provide first client 110 the response because first client 110 originated the first request.

After originating server 106 transmits the response to the first request in stage 250, method 200 may proceed to stage 255 where originating server 105 may receive a second request from second client 135. For example, second client 135 may be connected to originating server 105. The user using second client 135 may come up with another request for some data or some services. Consequently, the user may post the second request to originating server 105.

From stage 255, where originating server 105 receives the second request from second client 135, method 200 may advance to stage 260 where originating server 105 may determine that the second request can be fulfilled by the saved response to the first request. For example, in order to service the received second request, originating server 105 may query data store 115 to see if the current data associated with the first request can be used to service the second request. The current data associated with the first request may still be on originating server 105 because the predetermined time period for deletion of the current data may not have passed. Or originating server 105 may be configured to retain the current data indefinitely.

Once originating server 105 determines that the second request can be fulfilled by the saved response to the first request in stage 260, method 200 may continue to stage 285 where remote server 125 may receive a command to update the current data. The command may include updated data to replace the current data associated with remote server 125. For example, the current data that remote server 125 previously provided to originating server 105 may have changed. Consequently, remote server 125 may receive updated data to update the current data.

After remote server 125 receives the command to update the current data in stage 265, method 200 may proceed to stage 270 where remote server 125 may determine that the foreign reference is associated with the current data. For example, the previously written foreign reference may indicate that the current data had been previously provided to originating server 105. Consequently, originating server 105 may need the updated data.

From stage 270, where remote server 125 determines that the foreign reference is associated with the current data, method 200 may advance to stage 275 where remote server 125 may transmit, in response to determining that the foreign reference is associated with the current data, the updated data to originating server 105. Once remote server 125 transmits the updated data to originating server 105 in stage 275, method 200 may then end at stage 280.

An embodiment consistent with the invention may comprise a system for providing a distributed casual search. The system may comprise a memory storage and a processing unit coupled to the memory storage. The processing unit may be operative to determine, at an originating server, that a first request cannot be fulfilled by information associated with the originating server. In addition, the processing unit may be operative to post, from the originating server, the first request to a distributed request ring and to receive, at a remote server on the distributed request ring, the first request. In addition, the processing unit may be operative to query, by the remote server, for current data on a data store associated with the remote server that will satisfy the first request. Furthermore, the processing unit may be operative to write, by the remote server, a foreign reference in the data store, the foreign reference indicating that the originating sewer requested the current data. Moreover, the processing unit may be operative to receive, at the originating server, a response to the first request from the remote server, the response including the current data.

Another embodiment consistent with the invention may comprise a system for providing a distributed casual search. The system may comprise a memory storage and a processing unit coupled to the memory storage. The processing unit may be operative to determine that a first request cannot be fulfilled by information associated with the originating server. In addition, the processing unit may be operative to post the first request to a distributed request ring and to receive a response to the first request from a remote server, the response including current data. Moreover, the processing unit may be operative to save, at the originating server, the response to the first request, receive a second request from a second client, and to determine that the second request can be fulfilled by the saved response to the first request.

Yet another embodiment consistent with the invention may comprise a system for providing a distributed casual search. The system may comprise a memory storage and a processing unit coupled to the memory storage. The processing unit may be operative to receive, at a remote server on a distributed request ring, a first request and to query, by the remote server, for current data on a data store associated with the remote server that will satisfy the first request. Furthermore, the processing unit may be operative to write, by the remote server, a foreign reference in the data store, the foreign reference indicating that an originating server requested the current data. Moreover, the processing unit may be operative to receive, at the remote server, a command to update the current data, the command including updated data to replace the current data associated with the remote server. In addition, the processing unit may be operative to determine, at the remote server, that the foreign reference is associated with the current data and to transmit, in response to determining that the foreign reference is associated with the current data, the updated data to the originating server.

Figure 3:
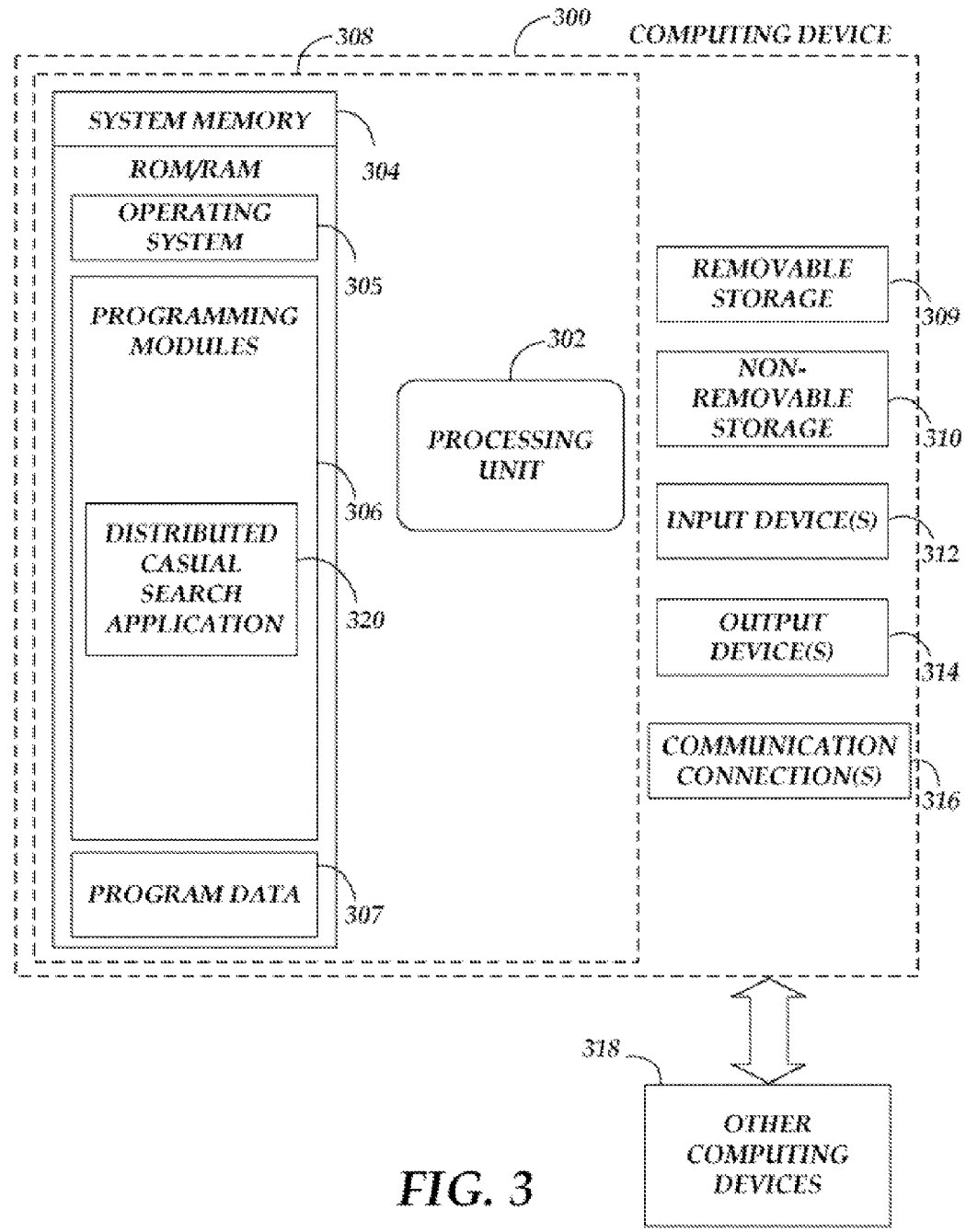
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned systems, devices, and processors are examples and other systems, devices, and processors may comprise the aforementioned memory storage and processing unit, consistent with embodiments of the invention.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory RAM)), non-volatile (e.g. read-only memory (ROM)), flash memory, or any combination. System memory 304 may include operating system 305, one or more programming modules 306, and may include a program data 307. Operating system 305, for example, may be suitable for controlling computing device 300's operation. In one embodiment, programming modules 306 may include, for example, distributed casual search application 320. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 318 that may allow device 300 to communicate with other computing devices 318, such as over a network in a distributed computing environment, for example, an intranet or the internet. Communication connection 316 is one example of communication media. Communication media may typically be embodied by computer readable instructions, data structures, program modules, or other data, in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g. distributed casual search application 320) may perform processes including, for example, one or more method 200's stages as described above. Moreover, other programming modules on one or more other computing device 318 may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as exam pie for embodiments of the invention.

What is claimed is:

1. A system for providing a distributed casual search, the system comprising an originating server comprising:
    a memory storage; and
    a processing unit coupled to the memory storage, wherein the processing unit is operative to:
        determine that a first request cannot be fulfilled by information associated with the originating server;
        post the first request to a distributed request ring;
        receive a response to the first request from a remote server, the response including current data, the remote server having a foreign reference written in response to receiving the first request by the remote server and employed to update the current data on the originating server when;
        the current data stored on a data store associated with the remote server is updated,
        a predicate created by an owner of the current data is satisfied, the predicate determining whether the updated current data is propagated to the originating server;
        save, at the originating server, the response to the first request; receive a second request from a second client; and determine that the second request can be fulfilled by the saved response to the first request.

2. The system of claim 1, wherein the processing unit is further operative to receive the first request from a first client.

3. The system of claim 1, wherein the processing unit is further operative to transmit, to a first client, the response to the first request.

4. The system of claim 1, wherein the processing unit is further operative to transmit, to the second client, the response to the second request.

5. The system of claim 1, wherein the processing unit being operative to post comprises the processing unit being operative to post to the distributed request ring comprising at least one other server.

6. The system of claim 1, wherein the processing unit being operative to post comprises the processing unit being operative to post the first request to the distributed request ring wherein the originating server does not know the identity of other servers on the distributed request ring.

7. The system of claim 1, wherein the processing unit being operative to post comprises the processing unit being operative to post to the distributed request ring information describing the first request and being configured to be received at an application program interface (API) of an operating system (OS) of at least one other server in the distributed request ring and an application program interface (API) of an operating system (OS) of a remote server.

8. A computer-readable storage device which stores a set of instructions which when executed performs a method for providing a distributed casual search, the method executed by the set of instructions comprising:

receiving, at a remote server on a distributed request ring, a first request;

querying, by the remote server, for current data on a data store associated with the remote server that will satisfy the first request;

writing in the data store associated with the remote server, a foreign reference indicating that the originating server requested the current data, wherein writing the foreign reference is triggered in response to receiving the query for the current data on the data store associated with the remote server;

receiving, at the remote server, a command to update the current data, the command including updated data to replace the current data associated with the remote server;

determining, at the remote server, that the foreign reference is associated with the current data; and transmitting, in accordance to the foreign reference, the updated data to the originating server, wherein transmitting, in accordance to the foreign reference, comprises transmitting the updated data when the foreign reference indicates that a predicate for transmission has been satisfied, the predicate being created by an owner of the updated data and indicating whether the updated data is to be propagated to the originating server.

9. The computer-readable storage device of claim 8, wherein writing the foreign reference comprises writing the foreign reference identifying the originating server.

10. A method for providing a distributed casual search, the method comprising:

determining that a first request cannot be fulfilled by information associated with an originating server;

posting the first request to a distributed request ring;

receiving a response to the first request from a remote server, the response including current data, the remote server having a foreign reference written in response to receiving the first request by the remote server and employed to update the current data on the originating server when:

the current data stored on a data store associated with the remote server is updated, and a predicate created by an owner of the current data is satisfied, the predicate determining whether the updated current data is propagated to the originating server;

saving, at the originating server, the response to the first request;

receiving a second request from a second client; and determining that the second request can be fulfilled by the saved response to the first request.

11. The method of claim 10, further comprising receiving the first request from a first client.

12. The method of claim 10, further comprising transmitting, to a first client, the response to the first request.

13. The method of claim 10, further comprising transmitting, to the second client, the response to the second request.

14. The method of claim 10, wherein posting comprises posting to the distributed request ring comprising at least one other server.

15. The method of claim 10, wherein posting comprises posting the first request to the distributed request ring wherein the originating server does not know the identity of other servers on the distributed request ring.

16. The method of claim 10, wherein posting comprises posting to the distributed request ring information describing the first request and being configured to be received at an application program interface (API) of an operating system (OS) of at least one other server in the distributed request ring and an application program interface (API) of an operating system (OS) of a remote server.

* * * * *